US012677142B2

(12) United States Patent
Haziza

(10) Patent No.: US 12,677,142 B2
(45) Date of Patent: Jul. 7, 2026

(54) MULTI-ORBIT, MULTI-SAT, MULTI-BAND SATELLITE COMMUNICATION AND SECURE COMMUNICATION VIA SPATIAL FIREWALL FROM SPACE

(71) Applicant: SDEROTECH, INC., Kiryat Bialik (IL)

(72) Inventor: Dedi David Haziza, Kiryat Motzkin (IL)

(73) Assignee: SDEROTECH, INC., Kiryat Bialik (IL)

( * ) Notice: Subject to any disclaimer, the term of this patent is extended or adjusted under 35 U.S.C. 154(b) by 287 days.

(21) Appl. No.: 18/236,333

(22) Filed: Aug. 21, 2023

(65) Prior Publication Data

US 2024/0236660 A1     Jul. 11, 2024

Related U.S. Application Data

(60) Provisional application No. 63/399,587, filed on Aug. 19, 2022.

(51) Int. Cl.
*H04W 12/03* (2021.01)
*H04B 7/185* (2006.01)
*H04W 12/088* (2021.01)

(52) U.S. Cl.
CPC ........ *H04W 12/03* (2021.01); *H04B 7/18513* (2013.01); *H04W 12/088* (2021.01)

(58) Field of Classification Search
CPC ... H04W 12/03; H04W 16/28; H04W 12/088; H04B 7/18513
See application file for complete search history.

(56) References Cited

U.S. PATENT DOCUMENTS

| | | | |
|---|---|---|---|
| 10,171,428 B2 * | 1/2019 | Yang | H04L 63/06 |
| 10,505,280 B2 | 12/2019 | Haziza | |
| 10,686,257 B2 | 6/2020 | Haziza | |
| 11,595,815 B2 * | 2/2023 | Reis | H04B 7/024 |
| 2019/0109713 A1 * | 4/2019 | Clark | G06F 16/182 |
| 2019/0296440 A1 * | 9/2019 | Haziza | H01Q 9/0457 |
| 2021/0258775 A1 * | 8/2021 | Reis | H04B 7/024 |

FOREIGN PATENT DOCUMENTS

WO    WO-2018125700 A1 *    7/2018    .......... H01Q 1/1257

OTHER PUBLICATIONS

"The HTTP Status Codes You Need to Know." Bearer, Medium, Feb. 11, 2020, https://medium.com/@BearerSH/the-http-status-codes-you-need-to-know-c0ef9fcdec54.*

* cited by examiner

*Primary Examiner* — Lizbeth Torres-Diaz
(74) *Attorney, Agent, or Firm* — WOMBLE BOND DICKINSON (US) LLP

(57) ABSTRACT

System and method for physical encryption of message. A plurality of satellites are in orbit around earth. A phase array antenna communicates with the satellites. A memory storage stores a code table, each code indicating segmentation instructions for a message to be transmitted. To transmit a message, the system fetches a code from the code table and segments the message to a plurality of segments according to the segmentation instructions. The antenna is aimed serially at different satellites to communicate with the selected satellites and transmit the segments.

13 Claims, 4 Drawing Sheets

MULTI-ORBIT, MULTI-SAT, MULTI-BAND SATELLITE COMMUNICATION AND SECURE COMMUNICATION VIA SPATIAL FIREWALL FROM SPACE

CROSS-REFERENCE TO RELATED APPLICATIONS

This application claims priority from U.S. Provisional Application No. 63/399,587, filed Aug. 19, 2022, the disclosure of which is incorporated herein by reference in its entirety.

BACKGROUND

Field

The subject disclosure relates to systems and methods for secure communication using transmission and reception from multiple satellites.

Related Art

Phase array antennas utilize multiple radiators operated in concert to generate a steerable beam. Generally, the signal for transmission is split into multiple paths to be fed to each of the radiators, and the phase of the signal for each radiator is controlled by a phase shifter. The individual phase shifts are designed to form and focus the beam, and to direct the beam to a desired direction.

As an example of phase shift array antenna, the subject inventor has previously disclosed designs of array antennas which utilize variable dielectric constant (VDC) materials to generate phase shifts for each radiator in the array, thus enabling software control of the antenna's scanning. See, e.g., U.S. Pat. Nos. 10,505,280 and 10,686,257, which are incorporated herein by reference in their entirety. As explained in these patents, when an appropriate electrical field is applied, the molecules rotate an amount that correlates with the strength of the applied field, and when the field is removed the molecules return to their relaxed state, thus changing the dielectric constant and affecting the transmission of an RF signal traveling in proximity to the molecules.

When employing phased array antennas for satellite communication, the antenna beam can be steered to follow the movement of the satellite in the sky, i.e., align and track. Additionally, phase shift can be used to steer the beam to jump from one satellite to another satellite or to other targets in the case of a terrestrial link. Since phase shift-based steering is relatively fast, as compared to mechanical steering, moving the beam among multiple satellite can be performed rapidly. In addition, since electrical steering doesn't involve any movement, the steering of the beam to a desired location can be done confidentially, i.e., it is impossible to know by visual inspection where the antenna is pointing at.

Recently several companies started forming low Earth orbit (LEO) satellite constellations, especially for Internet-based communication services. Such constellations can provide low-latency, high bandwidth (broadband) internet service. Examples of projects for LEO constellations include OneWeb (OneWeb constellation), SpaceX (Starlink), and Amazon's Project Kuiper. Since each of these projects involves the launch of hundreds and even thousands of satellites, an antenna with a view of the sky would have several satellites available to establish communication link at any given time, which is a critical part of the eco-system of this network. Since a phased array antennas have the capability to scan the beam, it can follow the motion of any of the satellites to maintain communication link and can switch between various networks of satellites instantaneously.

SUMMARY

The following summary of the disclosure is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Disclosed embodiments take advantage of phased array antenna scanning capability to perform physical encryption of its satellite-based communication. While any transmission from the antenna can be digitally encrypted, a second layer of physical encryption can be implemented by the disclosed embodiments, which provides a very difficult layer to circumvent.

In disclosed embodiments, physical encryption is performed by sectioning a message to be sent into multiple sections, and using communication links with several satellites to send the various sections. A code is sent with the transmission which informs the recipient system which satellites are to be used for reception and how to reassemble the message.

Disclosed embodiments provide a secured method for transmitting a message. A message to be sent is divided into multiple sections. A code is used to indicate the parameters of the message division and of the transmission. Importantly, the code indicates the operation of transmitting the various sections using multiple satellites, such that sections of the message are sent over multiple satellites. Consequently, the entire message cannot be obtained using reception from a single satellite. Rather, a receiving system must know the code in order to know from which satellites to receive the various sections and how to assemble the sections in order to reconstruct the message. The message may also include a reply code which indicates how to respond to the message.

By the embodiments disclosed herein, a message is sent securely by transmitting parts of the message using different satellites. Therefore, in order to obtain all of the parts of the message, a receiver must know from which satellite to receive which part of the message. A code table provides codes that enable both the sender and receiver to know which satellite is used for which part of the message.

The disclosed concept can be extended to provide secured communication using multiple links, i.e., terrestrial and or space alike, whenever the nature of the antenna of the client provides the ability to steer the beam fast enough and provide packet-based information splitting between multiple links and reconstruction at the hub side, i.e., the other location. It can also extend to support secured communications using the same concept by multiple beams spreading of information in spatial sense.

BRIEF DESCRIPTION OF THE DRAWINGS

Other aspects and features of the invention would be apparent from the detailed description, which is made with reference to the following drawings. It should be appreciated that the detailed description and the drawings provides various non-limiting examples of various embodiments of the invention, which is defined by the appended claims.

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

FIG. 1 is a general schematic of an embodiment for a system utilizing antenna array for satellite communication using physical encryption, while

DETAILED DESCRIPTION

Embodiments of the inventive system and method for encrypted communication via satellites will now be described with reference to the drawings. Different embodiments or their combinations may be used for different applications or to achieve different benefits. Depending on the outcome sought to be achieved, different features disclosed herein may be utilized partially or to their fullest, alone or in combination with other features, balancing advantages with requirements and constraints. Therefore, certain benefits will be highlighted with reference to different embodiments, but are not limited to the disclosed embodiments. That is, the features disclosed herein are not limited to the embodiment within which they are described, but may be "mixed and matched" with other features and incorporated in other embodiments.

Figure 1:
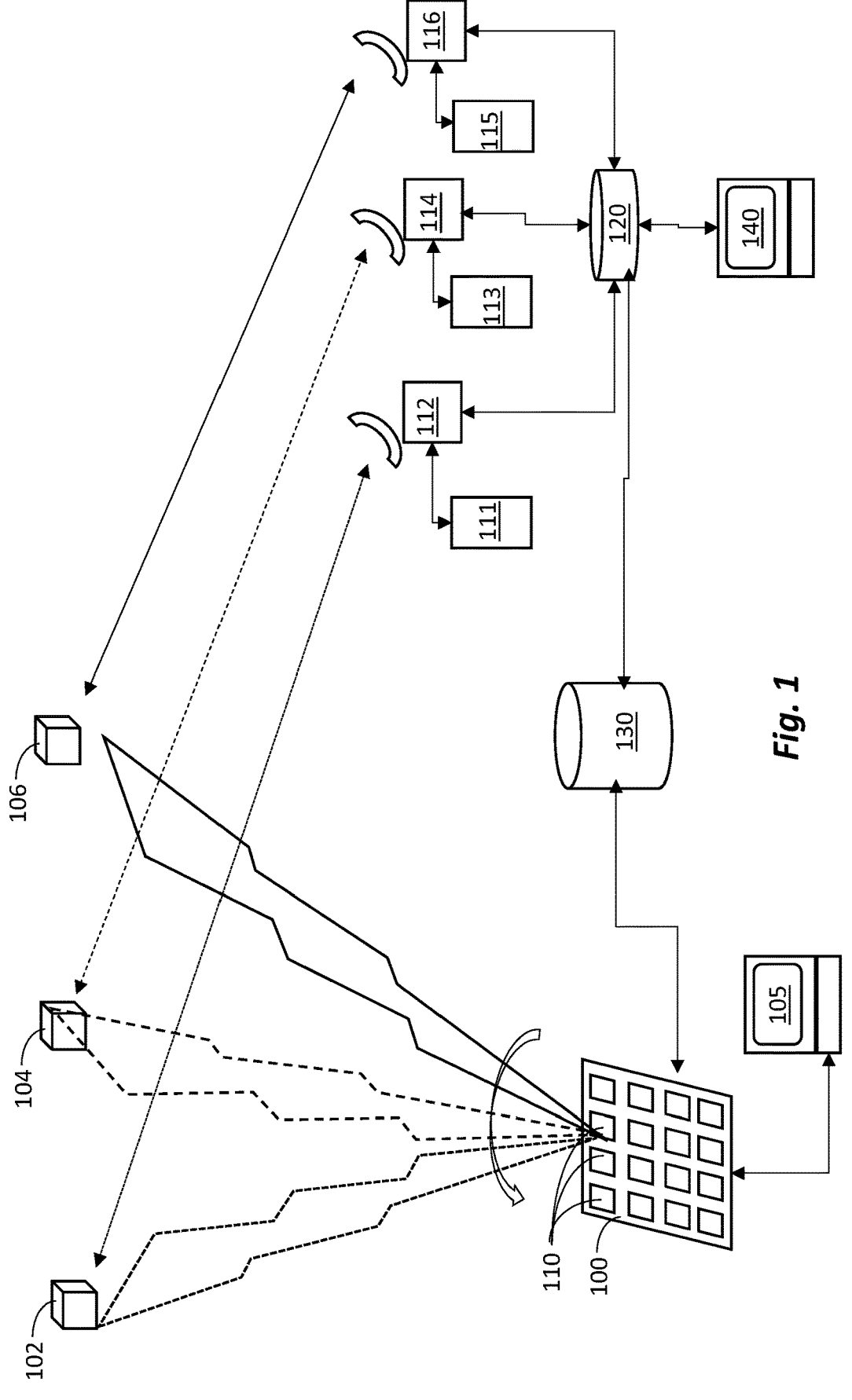

FIG. 1 is a general schematic of an array antenna 100 operated by a user seeking to send a highly confidential message from device 105, and thus wishes to encrypt the message. The antenna 100 is made up of multiple radiators 110, operated within an embodiment of the system for encrypted communication. By controlling the phase of each radiator 110 in the array, the beam of the antenna 100 can be shaped and steered. For example, the beam can be aimed for communication with either satellite 102, 104 or 106. The beam may also be steered so as to keep with the motion of either satellite in the sky, or can be steered to jump from one satellite to the other. Each of the satellites communicates with a respective base station 112, 114 and 116, (comprising a transceiver) and the transmissions from the transceivers of the base stations can be routed via router 120 to communication network, e.g., the Internet. Thus, device 140 may receive communications from either of the satellites via their transceiver stations, and also provide communication to be transmitted by any of the transceiver stations via their respective satellites.

In this respect, it is noted that as with all RF antennas, reception and transmission are symmetrical, such that a description of one equally applies to the other. In this description it may be easier to explain transmission, but reception would be the same, just in the opposite direction.

Figure 1A:
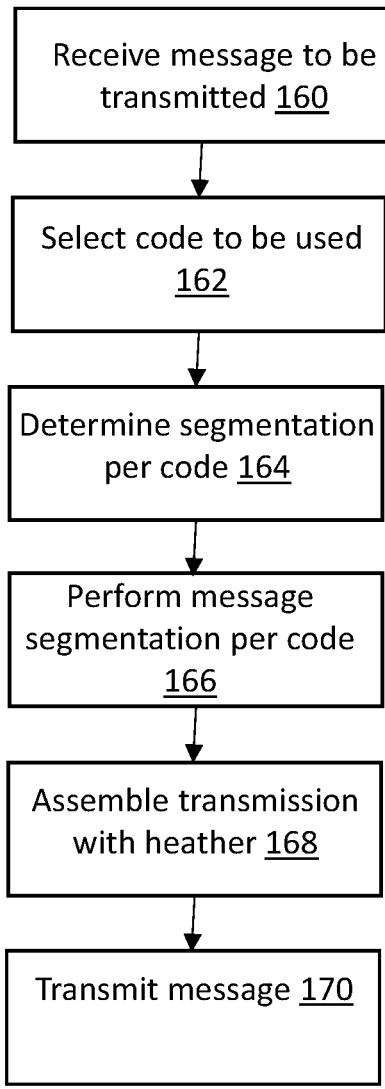
FIG. 1A illustrates an embodiment for a method for performing the physical encryption.

Referring to FIGS. 1 and 1A, according to embodiments, when at 160 the system receives a message to be transmitted using this constellation, at 162 the system accesses a code table and selects a code to be used for the transmission. The code table may be accessed, e.g., from control system 130 or other storage locations, e.g., local hard drive, secured storage location, etc. The code table includes a list of codes and transmission instructions corresponding to each code. The instructions may include, e.g., the number of segments, the length of each segment of the massage, the number of satellites to be used, the identity of the satellites to be used, the digital encryption to be used, etc. Notably, in order to transmit and receive the message both transmission and receiver systems must know the code being used. In FIG. 1 each base station has a code frame generator (CFG) 111, 113 and 115, which uses the code to determine how to reconstruct a received transmission or how to prepare a message for transmission.

Using a CFG or similar mechanism, in 164 it is determined how to segment the message, which satellites to use for transmission, etc. The message is then segmented in 166 to several segments, each to be transmitted individually via an assigned satellite, using at least two satellites. At 168 the message is assembled as required by the code, with the indication of the code inserted as a header. In 170 the message is transmitted, first by sending the header using an assigned satellite, and then the remaining segments are transmitted, each using its assigned satellite using multiple satellites. Consequently, the entire message cannot be received or intercepted by communicating with a single satellite. Rather, a receiving station must know what code was used during transmission in order to know via which satellites the segments were transmitted and in which order, so that the message can be reassembled using the various segments.

Thus, with the disclosed embodiments, a system for spatial encryption of message transmission is provided, comprising: a plurality of satellites in orbit around earth; at least one phase array antenna communicating with a plurality of visible satellites from the plurality of satellites; a memory storage storing a code table, the code table including a plurality of codes, each code indicating at least segmentation instructions for a message to be transmitted; a processor programmed to: upon receiving message to be transmitted, fetch a code from the code table and segment the message to a plurality of segments according to the segmentation instructions; and, upon receiving a transmitted message, obtain a code from a header of the transmitted message and reconstruct the transmitted message according to segmentation instructions of the code obtained from the header; and wherein the processor sends phase shift instructions to the phase array antenna to communicate with selected satellites from the visible satellites according to the code from the code table.

Figure 2:
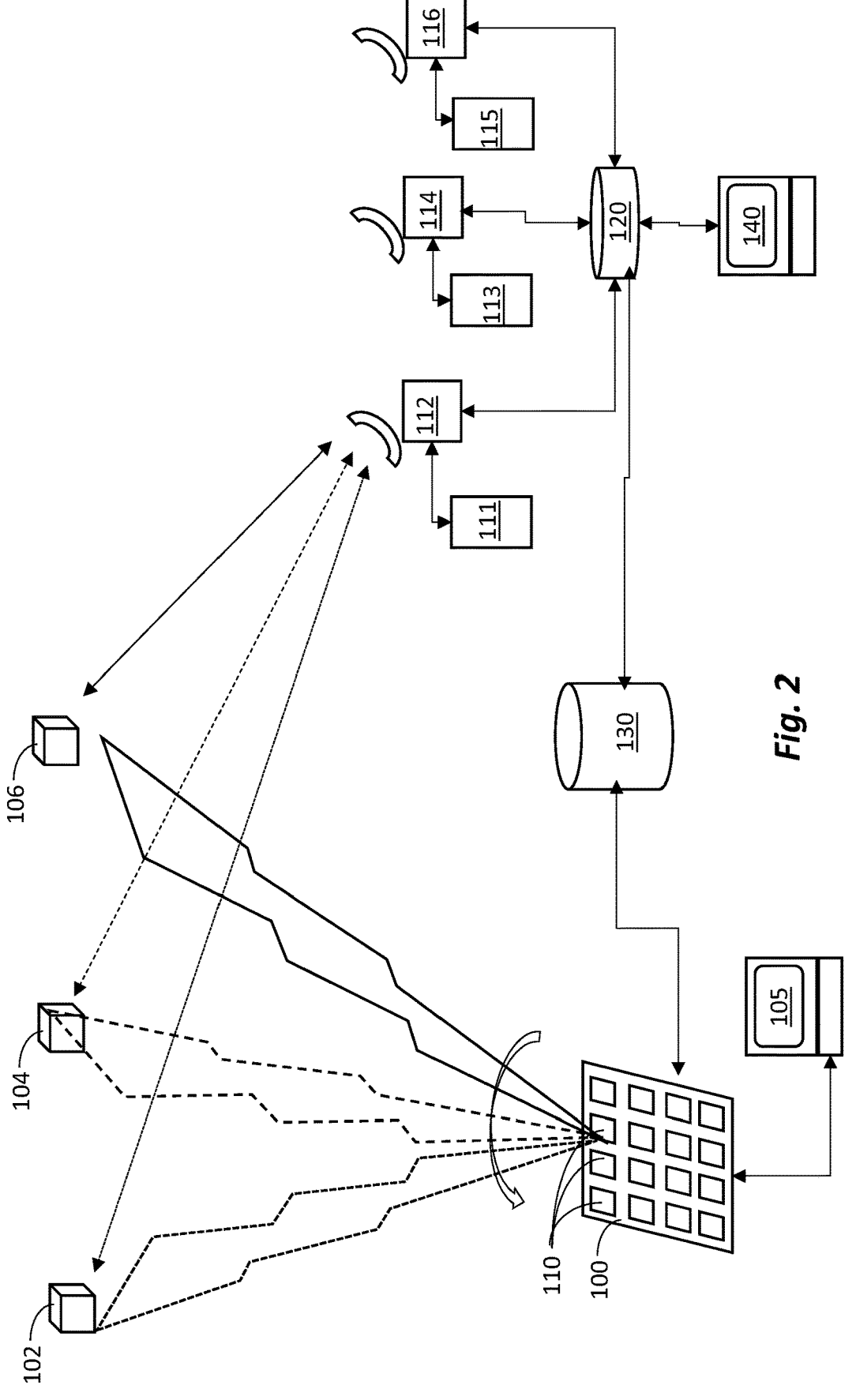
FIG. 2 illustrates another embodiment for a system utilizing antenna array for satellite communication using physical encryption.

In the embodiment of FIG. 1, each base station communicates with its assigned satellite. FIG. 2 illustrates an embodiment similar to that of FIG. 1, except that communication between the network and the satellites can pass through a single base station, e.g., base station 112. As shown, synchronization among the various elements of the system can be implemented by controller 130, which may be a central repository for the code table. Additionally, or alternatively, the code table can be duplicated and stored in the code frame generators (CFG) 111, 113 and 115.

Figure 3:
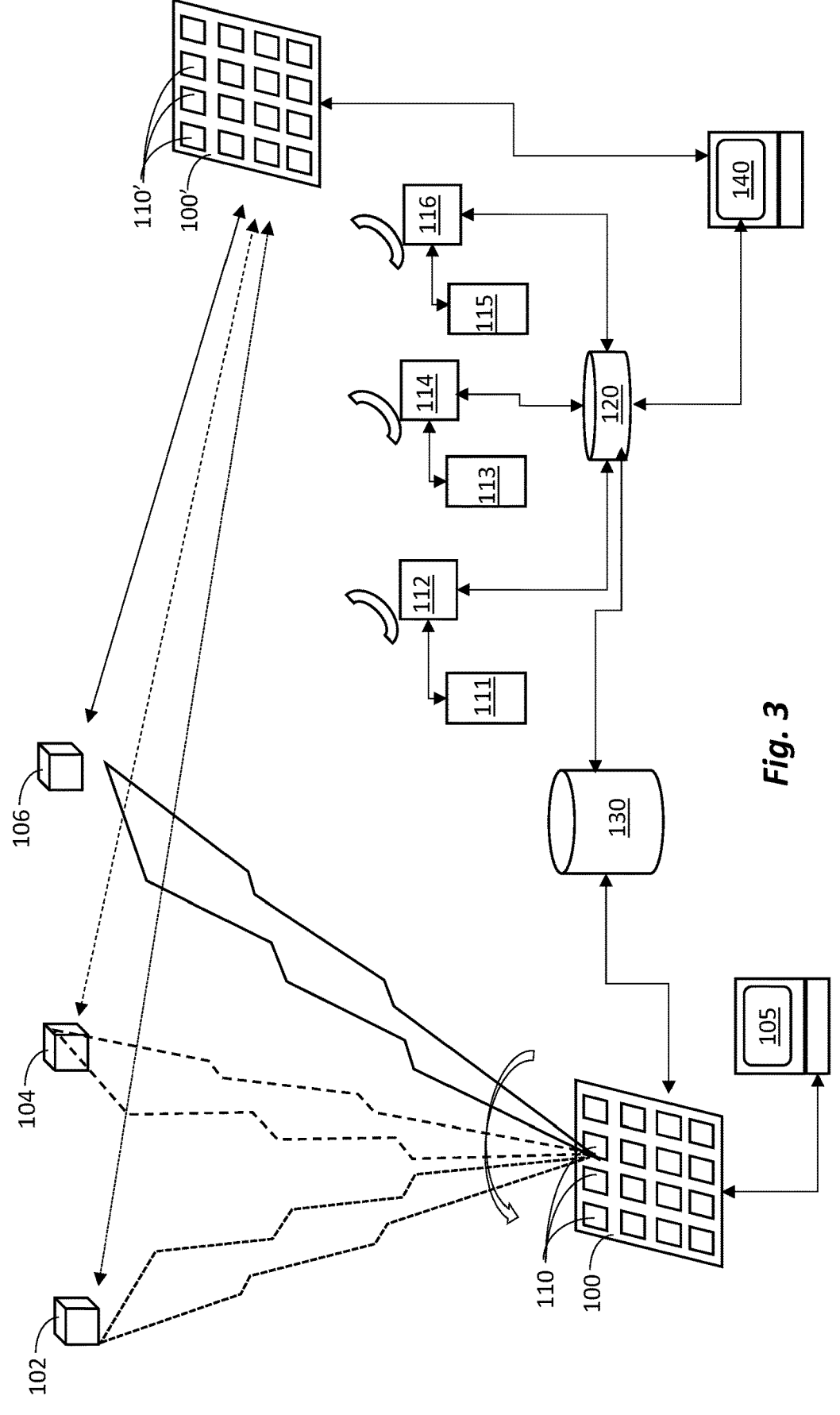
FIG. 3 illustrates an embodiment for a point-to-point communication employing physical encryption.

FIG. 3 illustrates an embodiment for a point-to-point communication. In FIG. 3 the recipient device 140 is also coupled to a phase shift antenna 100'. Thus, when the message is sent from the antenna 100, the header is received via antenna 100' and is read by device 140. Using the code from the header, the device 140 issues instructions for phase shifts of radiators 110', so that the beam of the antenna 100' is aimed at the proper satellites to receive each subsequent segment of the message. In this manner, for each segment to be transmitted, the beam of antenna 100 is directed to the appropriate satellite as indicated by the code, and the antenna 100' is directed to that same satellite to receive the segment.

Since the message is broken into several segments and each segment is transmitted through a different satellite, the transmission is referred to as physically encrypted. Additionally, prior to transmission, each segment can also be digitally encrypted, e.g., by converting plaintext, into an alternative form known as ciphertext and using public-keys and symmetric-keys.

Thus, a method for physical encryption of a message is provided, comprising: obtaining a message to be transmitted; obtaining a code for transmission of the message; segmenting the message to a plurality of segments according to segmentation information included in the code; transmitting a header including the code to a first satellite; transmitting selected segments of the plurality of segments to the first satellite; transmitting remaining segments of the plurality of segments to a second satellite.

Also, a method for physical encryption of a message is provided, comprising: obtaining a message to be transmitted; obtaining a code for transmission of the message; segmenting the message to a plurality of segments according to segmentation information included in the code; forming a header including the code and assigning the code to be transmitted to satellite of a plurality of satellites; assigning each segment of the plurality of segments to an assigned satellite of the plurality of satellites; transmitting the header and the plurality of segments according to the assignments.

Generally, a message may also include an assigned code for the reply. For example, the header may include a code for transmission of the current message, but also include a reply code, instructing the receiving party the code to be used when sending a reply. Thus, in effect, any message in a string of communication can be transmitted using a different code, i.e., a different method of sectioning the message and a different set of satellites.

When receiving a message, a method can be employed, comprising: receiving transmission of a header and inspecting the header to determine parameters of the message to be received and identity of participating satellites to receive message segments from; using information of the header, generating phase shift instructions to direct phased array antenna towards a different one of plurality of participating satellites and receive a message segment repeatedly until all segments of the message have been received; using information from the header to assemble the segments to reconstruct the message.

It should be understood that processes and techniques described herein are not inherently related to any particular apparatus and may be implemented by any suitable combination of components. Further, various types of general purpose devices may be used in accordance with the teachings described herein. The present invention has been described in relation to particular examples, which are intended in all respects to be illustrative rather than restrictive. Those skilled in the art will appreciate that many different combinations will be suitable for practicing the present invention.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A system for spatial encryption of message transmission, comprising:
a plurality of satellites in orbit around earth; and
a multiple link communication system comprising:
at least one phase array antenna communicating with a plurality of visible satellites from the plurality of satellites;
a memory storage storing a code table, the code table including a plurality of codes, each code indicating at least segmentation instructions for message transmission;
a processor coupled to the at least one phase array antenna and coupled to the memory storage and programmed to:
upon the multiple link communication system receiving a message to be transmitted, fetch a code from the code table and segment the message according to the segmentation instructions, wherein the segmented message to be transmitted includes a header indicating the code, the header further including a reply code indicating at least segmentation instructions for message transmission to be used when sending a reply; and,
upon the multiple link communication system receiving a transmitted message, obtain a code from a header of the transmitted message and reconstruct the transmitted message according to segmentation instructions of the code obtained from the header; and,
wherein the processor sends phase shift instructions to the phase array antenna to communicate with selected satellites from the visible satellites according to such code from the code table.

2. The system of claim 1, wherein the multiple link communication system further comprises a plurality of base stations in communication with the plurality of satellites.

3. The system of claim 2, wherein the multiple link communication system further comprises a router coupling the plurality of base stations to a communication network.

4. The system of claim 3, wherein the communication network comprises a specific communication network known as the Internet.

5. The system of claim 2, wherein each of the base stations communicates with one of the plurality of satellites.

6. The system of claim 2, wherein the multiple link communication system further comprises a plurality of code frame generators, each coupled to one of the base stations, each preprogrammed with the code table.

7. The system of claim 1, wherein the multiple link communication system further comprises a receiving phase shift antenna receiving the code from the header and implementing phase shift according to the code fetched from the header.

8. A method for physical encryption of a message is provided, comprising:
obtaining at a multiple link communication system a message to be transmitted;
obtaining at the multiple link communication system a code for transmission of the message; segmenting the message to a plurality of segments according to segmentation information included in the code;

forming at the multiple link communication system a header including the code and assigning the code to be transmitted to satellite of a plurality of satellites, the header further including a reply code indicating at least segmentation instructions for message transmission to be used when sending a reply;

assigning at the multiple link communication system each segment of the plurality of segments to an assigned satellite of the plurality of satellites; and transmitting from the multiple link communication system the header and the plurality of segments according to the assignments.

9. The method of claim 8, wherein transmitting the header and the plurality of segments according to the assignments comprises steering transmission beam of an array antenna to aim the transmission beam to the assigned satellite for transmission of each segment.

10. The method of claim 9, wherein steering transmission beam comprises generating phase shift signals for the array antenna.

11. The method of claim 10, further comprising digitally encrypting each of the segments.

12. The method of claim 8, wherein transmitting from the multiple link communication system the header and the plurality of segments according to the assignments further comprises transmitting the reply code indicating a code to be used when replying to the message.

13. A method for a multiple link communication system receiving message transmission from a plurality of satellites, comprising:

receiving transmission of a header and inspecting the header to determine parameters of a message to be received and identity of participating satellites to receive message segments from and further to determine a reply code of the header indicating at least segmentation instructions for message transmission to be used when sending a reply;

using information of the header, generating phase shift instructions to direct phased array antenna towards a different one of plurality of participating satellites and receive a message segment, repeatedly until all segments of the message have been received;

using information from the header to assemble the segments to reconstruct the message.

* * * * *